Aug. 10, 1937.  B. LOEFFLER  2,089,279

ELECTRICAL DIESEL AIR CHAMBER VALVE CONTROL MECHANISM

Filed Oct. 1, 1935

INVENTOR.
Bruno Loeffler,
BY Hoguet, Neary & Campbell,
HIS ATTORNEYS

Patented Aug. 10, 1937

2,089,279

UNITED STATES PATENT OFFICE 2,089,279

ELECTRICAL DIESEL AIR CHAMBER VALVE CONTROL MECHANISM

Bruno Loeffler, Plainfield, N. J., assignor to International Motor Company, New York, N. Y., a corporation of Delaware Application October 1, 1935, Serial No. 43,023

1 Claim. (Cl. 137—139)

The present invention relates to control mechanisms for valves of Diesel air chambers by means of which the valves may be properly controlled from a remote station and embodies, more specifically, an improved Diesel air chamber valve control mechanism by means of which the operation of the valve may be effected electrically.

In certain types of Diesel engines the combustion space within the cylinder is supplemented by means of combustion and air chambers. Where these chambers are arranged in tandem, proper control of the engine is effected by controlling the communication between such chambers in accordance with predetermined practice. For example, the air chamber, between which and the cylinder the combustion chamber is located, is provided with a valve by means of which communication between the air chamber and combustion chamber may be prevented, the air chamber also being provided with exhaust ports by means of which communication between the air chamber and the external atmosphere may be effected. A single valve may thus serve to close the passage between the air chamber and the combustion chamber or the passage between the air chamber and the external atmosphere, and the present invention is concerned with improved mechanism by means of which the operation of such valve may be effected.

An object of the invention, accordingly, is to provide a Diesel air chamber valve control mechanism by means of which effective control of the valve may be accomplished from a remote position.

A further object of the invention is to provide a mechanism of the above character wherein the operation of the valve is accomplished through electrical instrumentalities.

A further object of the invention is to provide a valve control mechanism of the above character by means of which the valve may be moved to any of three positions.

A further object of the invention is to provide an electrical valve control mechanism of the above character by means of which proper actuation of the valve may be effected by electrical instrumentalities which are so formed as to produce the desired valve motion with a minimum size equipment, thus relieving the battery or other source of electricity from substantial strain.

Further objects, not specifically referred to above, will be apparent as the invention is described in connection with the accompanying drawing, wherein—

Figure 1:
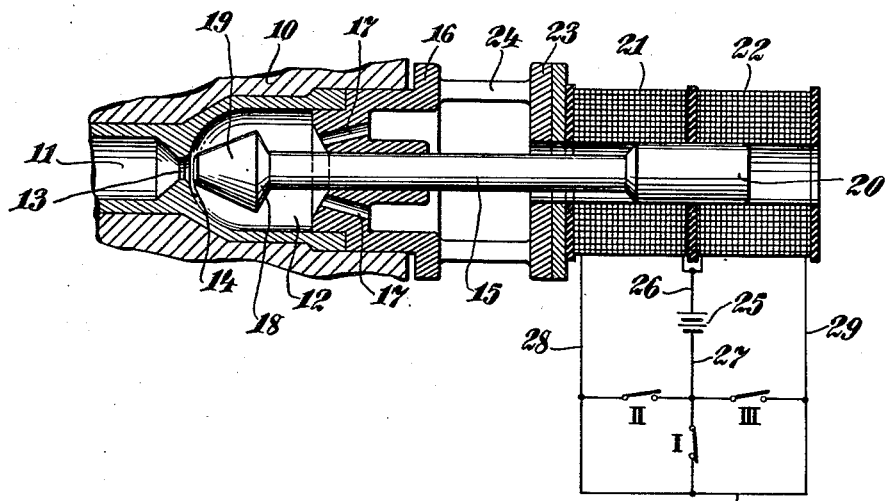
Figure 2:
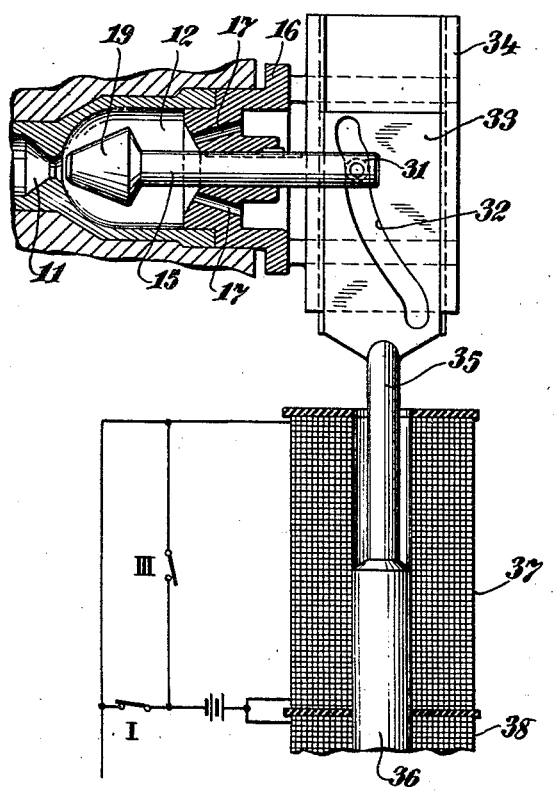

Figure 1 is a view in longitudinal section, taken through a valve and actuating mechanism therefor, the electrical system for controlling the actuating means being indicated diagrammatically; and Figure 2 is a view similar to Figure 1, showing a modified form of the invention.

With reference to the construction shown in Figure 1, the head of a Diesel engine is shown at 10 within which a combustion chamber 11 is formed. An air chamber 12 communicates with the combustion chamber 11 through a valve port 13 which is adapted to be closed by means of a valve 14. On valve 14 is mounted a valve stem 15 which is slidably mounted in a cover plate 16, secured to the head 10. One or more ports 17 are formed in the cover plate and are adapted to be closed by a valve 18, also formed upon the stem 15.

Successful operation of the engine requires that the valve body 19, upon which the valves 14 and 18 are formed, may be moved to an intermediate position, illustrated in Figure 1, in order that compression within the cylinder may be avoided during the cranking operation. During the starting operation, the valve 14 closes port 13 in order that the compression within the cylinder may be built up substantially. During running of the engine the valve 18 closes ports 17 and thus establishes communication between combustion chamber 11 and air chamber 12.

In order that the valve body 19 may be moved into the foregoing positions, the valve stem 15 is formed with a solenoid armature 20 which is slidable within solenoids 21 and 22. These solenoids are mounted upon a frame 23 which may be secured to cover 16 by means of arms 24. A battery 25 or other suitable source of electricity is connected to the solenoids 21 and 22 by means of wire 26 and switches I, II and III are connected to the other terminal battery by means of wire 27. Wire 28 connects switch II to the solenoid 21, while wire 29 connects switch III to the solenoid 22. A wire 30 connects switch I to the wires 28 and 29 and thus enables both solenoids 21 and 22 to be energized simultaneously.

By closing switch I, both solenoids 21 and 22 are energized and the valve body 19 is moved to the position shown in Figure 1. By opening switch I and closing switch II, the solenoid 21 is energized and the armature 20 is moved to the left, causing valve 14 to close port 13. By opening switches I and II and closing switch III, the solenoid 22 is energized and valve 18 closes ports 17. In this fashion, all conditions of operation are met with and the valve may be controlled effectively from a remote station.

In the construction shown in Figure 2, the valve stem 15 is provided with a roller 31 which engages a cam track 32 formed in a plate 33 which is slidable in a guide 34 mounted transversely of the axis of the valve stem 15. The plate 33 is formed with a stem 35 upon which a solenoid armature 36 is formed. As in the construction shown in Figure 1, solenoid armature 36 is movable axially of solenoids 37 and 38 and may be controlled by the electrical system described in connection with the construction shown in Figure 1. By the mechanism shown in Figure 2, motion of the valve 15 is accomplished effectively by a relatively weak source of current in view of the mechanical advantages afforded by the cam track 32 and roller 31.

While the invention has been described with specific reference to the construction shown in the accompanying drawing, it is not to be limited, save as defined in the appended claim.

I claim:

Control and actuating means for air valves for controlling the compression and ignition of compression-ignition engines wherein an engine head is formed with combustion and air chambers having a port therebetween and a port between the air chamber and the external atmosphere and a valve is provided for closing the ports selectively, the control and actuating means comprising a valve and valve rod, a plate slidable transversely of the rod and formed with a cam groove therein, a roller on the rod engaging the groove, an armature on the plate, aligned solenoids in operative relation to the armature, and electrical connections to energize the solenoids individually or simultaneously.

BRUNO LOEFFLER.